May 26, 1942.  G. F. ERATH  2,284,409
FITTINGS FOR TEMPERED GLASS PANELS
Filed March 8, 1940  3 Sheets-Sheet 1

INVENTOR
GEORGE F. ERATH
BY Olew E. Bee
ATTORNEY.

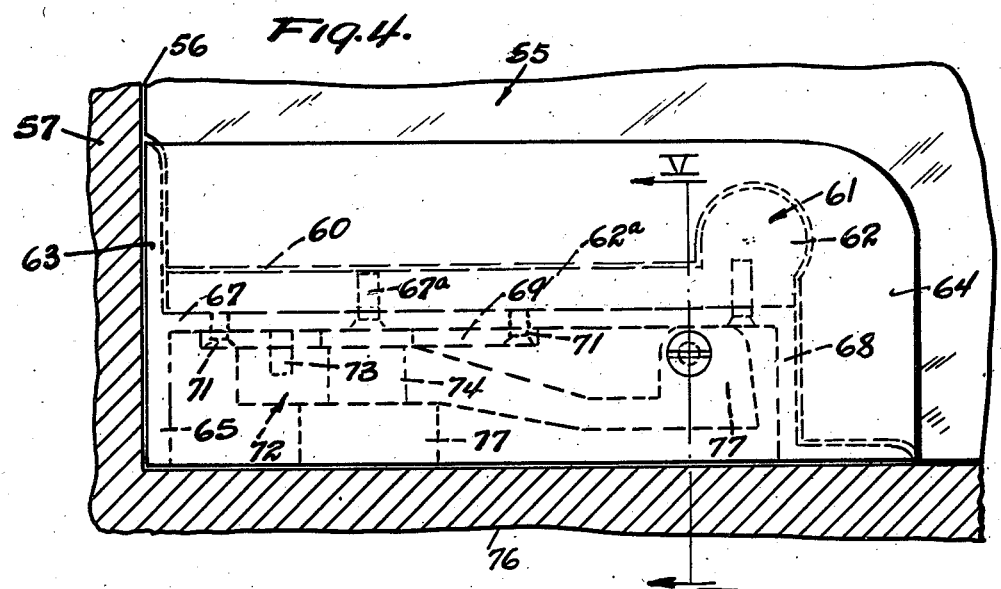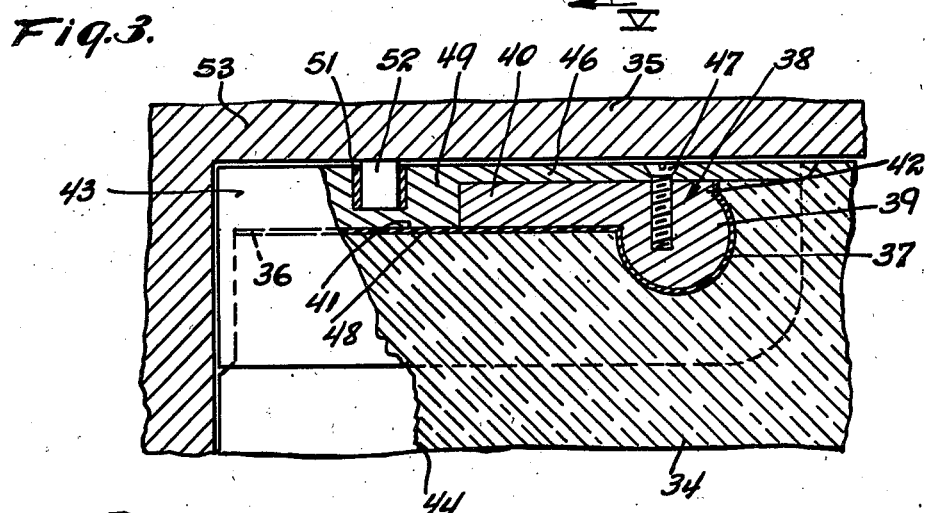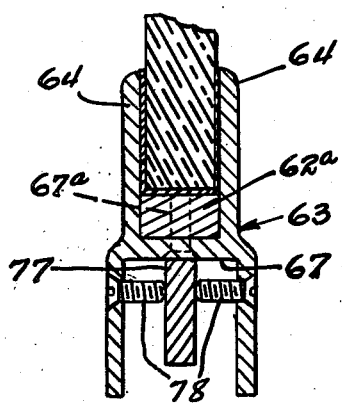

May 26, 1942.　　　G. F. ERATH　　　2,284,409
FITTINGS FOR TEMPERED GLASS PANELS
Filed March 8, 1940　　　3 Sheets-Sheet 3

INVENTOR
GEORGE F. ERATH
or Olew E. Bee
ATTORNEY.

Patented May 26, 1942

2,284,409

UNITED STATES PATENT OFFICE 2,284,409

FITTING FOR TEMPERED GLASS PANELS

George F. Erath, Queens Village, N. Y., assignor to Pittsburgh Corning Corporation, Allegheny County, Pa., a corporation of Pennsylvania Application March 8, 1940, Serial No. 322,951

4 Claims. (Cl. 20—16)

The present invention relates to fittings for securing articles of hardware such as supports, hinges and bolts to doors or similar panels, and it has particular relation to fittings suitable for use with doors comprising single massive panels of tempered glass or similar hard and brittle material.

One object of the invention is to provide a fitting of the foregoing type which is simple in design, rugged and secure in operation and which can be mounted with a minimum of deformation or cutting of the panel to which it is applied.

A second object of the invention is to provide hardware mountings for doors of glass which will harmonize with and will not destroy the architectural effect produced by doors comprising monolithic panels of glass.

A third object of the invention is to provide a fitting for panels of glass which can be applied to the panel without use of screws or other devices inserted in or passing through the glass.

These and other objects of the invention will be apparent from consideration of the following specification and the appended claims.

The technique of tempering or heat-treating massive sheets or panels of glass for purposes of increasing the strength thereof has recently been brought to a high degree of perfection. Panels so treated possess a strength approximating that of cast iron and are also possessed of the transparency and beauty characteristic of glass. It has been proposed to employ panels of such material for various purposes including that of providing closure elements for doors in the buildings. However, difficulty has been encountered in connection with such structures, because of the peculiarities of the material. In particular tempered glass panels while characterized by great strength and hardness, yet are sensitive to scratches upon the surface thereof. A small scratch may even result in complete shattering of the entire panel into minute fragments. For this reason any cutting operations to be performed upon the panels must be effected before the tempering operation is performed. Furthermore, care must be observed in the shaping and location of any openings or notches which are to be formed in the panel. For example, small holes for fastening screws or bolts are not permissible because it is found practically impossible to temper a panel containing such holes. Corners in notches and the like must also be carefully rounded and the radii of curvature must be comparatively large or similar results will be obtained. Moreover, the architectural effect of a single massive panel of crystal clear glass is to be maintained, which precludes the use of a supporting or reinforcing framework for the panel. These characteristics present difficulties in the provision of hinged or lock mountings suitable for use in connection with door panels. The conventional methods of securing hinges by means of bolts or similar devices passing through holes or openings in the material are impracticable.

In accordance with the provisions of the present invention the foregoing difficulty is overcome by provision of a fitting suitable for securing hinges, locks and the like to door panels of tempered glass, which fitting includes a body portion having a boss adapted to fit into corresponding recesses in a door panel, said recesses and bosses being so formed that the fitting can not be retracted by moving it in the plane of the door. As a further feature the construction includes a shoe secured to and enclosing the fitting and engaging the edges of the panel adjacent thereto in such manner as positively to prevent displacement of the panel.

For a better understanding of the invention reference may now be had to the drawings in which Figure 1 is an assembly view showing the application of the invention to a bolt structure suitable for latching the lower corner of a door to the floor of a building.

Figure 3 is a fragmentary sectional view showing the application of the principles of the invention to the formation of an upper hinge of a door panel.

Figure 4 is a sectional view showing the application of the invention to the provision of a bottom hinge structure for a door.

Figure 5 is a sectional view taken substantially upon the line V—V of Figure 4.

In the drawings like numerals refer to like parts throughout.

Figure 1:
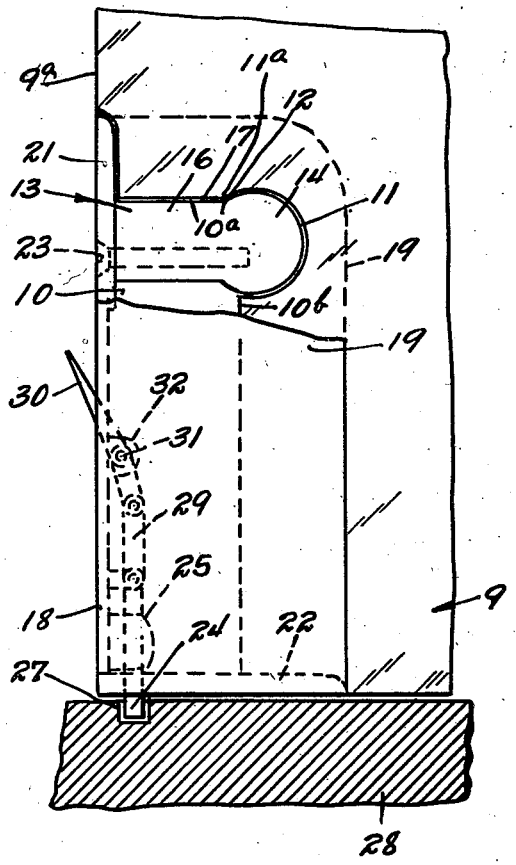
Figure 2:
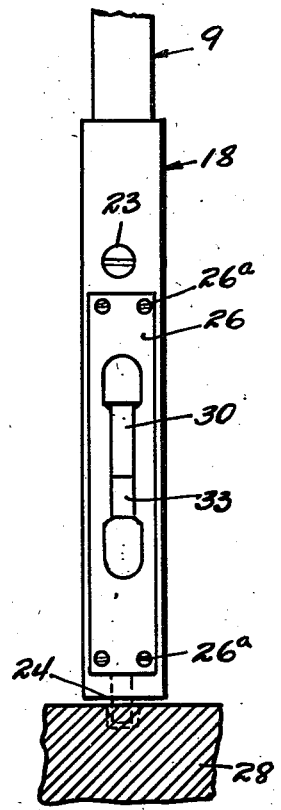
Figure 2 is a fragmentary view showing in elevation the construction disclosed in Figure 1.

In the floor bolt construction as illustrated in Figure 1 of the drawings the lower free corner of a door panel of tempered glass is cut entirely away, to provide an approximately rectangular notch, having the V-like corner portion cut entirely away as indicated at 11 to form a recess extending from face to face of the glass, which notch preferably is approximately circular in outline and which communicates with the recess 10 through a restricted throat 12.

It is to be observed that one edge 10a of notch 10 is substantially perpendicular to original edge 9a of panel 9 and that edge 10b is approximately parallel to the latter edge. The notch 11 substantially undercuts the edge 10a thus providing a shoulder 11a which projects forwardly to form the restriction 12 between the notch and the recess.

A body or core 13 including an enlarged portion 14 bulbous in section, corresponding in contour to the outline of the notch 11 and a rectangular portion 16 is disposed with the enlarged portion in the notch and with the rectangular portion resting at its upper edge against the upper edge 17 of the recess. It will be apparent that with the body or core disposed in this position it is keyed in place by the restriction of the throat 12 and cannot be retracted by moving it in the plane of the door panel. Therefore, in order to insert it in position it must be moved sidewise into the notch by moving it perpendicular to the latter plane.

The body is secured from lateral displacement by means of a shoe element 18 designed to provide a covering for the recess 10 and including sides 19 constituting cover plates for the notch, which plates are interconnected along the vertical edges by a web portion 21. The lower edges of the sides may also be interconnected by a web 22. The shoe is secured to the body 13 by means of a bolt 23 extending through a suitable hole in the vertical web 21 and being threaded into the body portion.

In the assembly of the elements, after the body portion is disposed in the notch 11 with the rectangular portion 16 engaging the edge 17, the shoe is slid into position to enclose it and also to engage the edge portions of the door panel about the recess 10. The bolt 23 is then inserted in order to bind the shoe and the body or core securely together into a unit which can not be removed or displaced from position. Any tendency of the fitting to tip upwardly about portion 14 is resisted by bearing of portion 16 against the edge 17.

In order further to enhance the tightness and security of the grip of the shoe 18 upon the faces of the panel and of the edges of glass upon the body 13, the space between the glass and the adjacent metal of the fittings may be packed by Rose's metal, which preferably is flowed in while molten and expands upon cooling.

A suitable bolt structure for use in the fitting includes a vertically reciprocable bolt 24 sliding in an opening in a bracket 25 upon the rear face of a plate 26 secured in the opening by means of bolts 26a. The bolt at its lower end is adapted to project into a suitable socket 27 formed in the floor 28 below the edge of the door, and at its upper extremity is pivotally attached to a link 29 which is further pivotally connected at its upper end to the inner extremity of a lever 30 as shown in full line in intermediate position. The lever in turn is pivoted intermediate of its length by means of a pin 31 between brackets 32, secured to the inner face of the plate 26. The other extremity of the lever projects outwardly through a suitable opening 33 formed in the plate 26 in position to be manually manipulated by the user of the door. By swinging the lever up or down it is possible to project the bolt 24 into the socket 27. Likewise by reversing the lever the bolt may be retracted to free the door for swinging movement.

The application of the principles of the invention to an upper hinge structure is illustrated in Figure 3. In this construction the corner of the door panel 34, in an opening in a building wall 35, is cut away to form a notch 36 corresponding to the notch 10 and including a recess 37 extending from face to face of the panel and corresponding to the recess 11 in outline and operation. The core 38, for insertion in the notch, includes a portion 39, bulbous in sectional outline, fitting within the notch 37 and also including a bracket 40 adapted to bear along its lower face upon the upper edge 41 of the notch. It will be apparent that the recess 37 is so formed as to provide a restriction or throat portion 42 so that the core cannot be inserted in or retracted from the recess by moving it in the plane of the door, but can only be inserted or removed by moving it in a direction perpendicular to said plane.

A shoe 43 for securing the core in position comprises side portions 44 similar to those of the shoe 18 and a web 46 interconnecting the side portions. The web is secured to the core by means of screw 47 so that all of the parts are so keyed together that it is impossible to separate them without breakage of the glass. However, to assure tightness of the fit of the parts, a packing 48 of Rose's metal may be run in while molten.

The forward portion of the web is thickened as at 49 and is formed with a socket in which is disposed a bearing 51 for a pintle 52 projecting downwardly from the lower face of the lintel structure 53 of the door opening.

The application of the features of invention to the lower hinge of a door is illustrated in Figures 4 and 5. In this construction the lower corner of the door panel 55, in an opening 56, in a building wall 57, is cut away to provide a recess 60 carresponding in outline to the recesses 10 and 36, which have already been described. The core or body element for insertion in this recess, indicated at 61, includes a boss or enlarged portion 62 adapted to fit within a corresponding notch, in order to lock the body from retraction from the recess by removing it in the plane of the door and an extension 62a bearing upon the horizontal edge of the recess.

The shoe 63 for enclosing the core or body includes side portions 64 and end web 65 and a horizontal web 67, the latter of which is disposed intermediate of the upper and lower edges of the side portions. It, also, is secured by screws 67a to extension 62a. It will be apparent that the web also includes a vertical rear portion 68 engaging the rear face of the recess 60 and thus providing a receptacle enclosed on the four sides and at the top, but being open at the bottom.

The hinged structure disposed in this receptacle includes an adapter plate 69, which is secured by means of screws 71 to the web 67. A hinged arm 72 which may constitute the conventional arm of the usual spring actuating bottom hinge of a heavy door is pivoted for slight rotational movement upon the adapter plate by means of vertical pin 73. The arm is, also, provided with a recess preferably of non-circular outline in which is disposed the upper extremity 74 of the lower pivot 75 of the door. The pivot extends downwardly to suitable check mechanism (not shown) in floor 76.

The forward extremity of the arm is provided with a bracket 77, which as indicated in Figure 5, is engaged by set screws 78, threaded through the side walls 64 of the shoe. By proper adjustment of these set screws it is possible to change the angle of the arm about pin 73 with respect to the plane of the door panel, in order to assure that it will come to rest at proper position in the door opening when closed.

As in all of the embodiments of the invention, it may be desirable to provide a filling or packing between the edges of the core or body element and the contiguous edge of the glass. Such filling or packing may be formed of cement, fiber, a plastic substance, or preferably the space is simply filled with a soft easily fusible metal such as Rose's metal. If the latter is employed, it does not harm the glass even when molten, and it tends to expand as it chills, thus assuring that the space will be completely filled with the metal at all temperatures.

It is to be observed that the door panels herein described are relatively massive, preferably being from about ½ to 1½ inches thick and that the edges, aside from the hinge mountings, are free of supports so that all stresses are directly transmitted to the glass in a zone about the hinge. Such type of hinge mounting would be utterly impracticable except with a panel of tempered glass.

Figure 6:
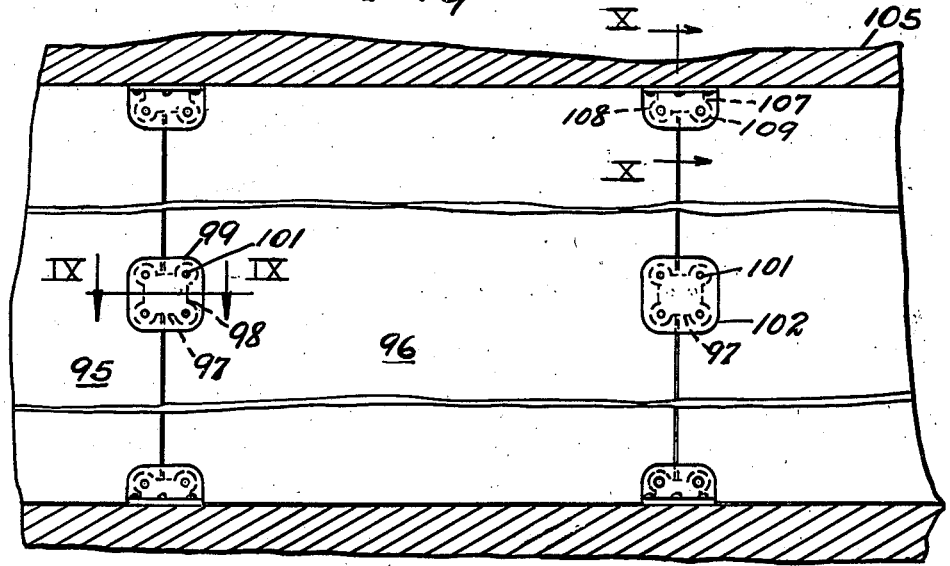
Figure 6 is a fragmentary view partly in section and partly in elevation, showing application of the invention to the mounting of panels of tempered glass.
Figure 7:
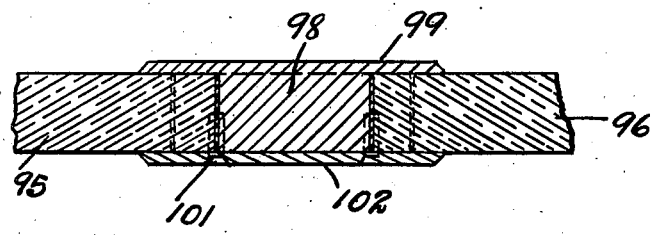
Figures 7 and 8 are sectional views taken respectively upon the lines VII—VII and VIII—VIII of Figure 6.
Figure 8:
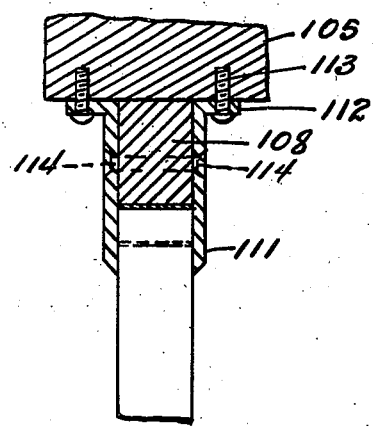

In Figures 6, 7, and 8 is illustrated the application of the principles of the invention, to the provision of securing means for panels of tempered glass in a building wall. As shown in Figures 6 and 7 a plurality of panels 95 and 96 may be secured together intermediate of their upper and lower edges by means of a suitable device. In this construction each edge of the panel is rectangularly notched as indicated at 97, the two corners of the notch are provided with restricted recesses 97a, and a body 98 of cast iron or other suitable metal is so formed as substantially to fill the notches in the mating edges of each of two adjacent panels. The body may be formed integral with or otherwise secured upon one side to a plate 99, the marginal portions of which overlap the adjacent portions of the glass. Upon the opposite face of the body is secured by means of screws 101 a covering plate 102, which substantially corresponds in outline to the plate 99.

The upper and lower edges of the panels 95 and 96 may be secured to the ceiling 105 and floor 106 respectively of a building by any convenient means. However, if desired, the construction shown in Figures 1 and 3 may be employed. In this construction the corners of each panel are notched in substantially the same manner as indicated in Figures 1, 3 and 4 of the drawings, to provide a rectangular notch 107, adapted to receive a body 108, which has rounded bosses 109 at each of the lower corners thereof. This body is held in position with respect to the glass by means of angle plates 111 which have upper flanges 112 secured to the ceiling or floor (as may be) by screws 113. The vertical flanges of the angle members overlap the edges of the glass about the notches and may be secured to the body 108 by means of screws 114 extending through openings in the flange and being threaded into the body 108.

An important advantage of the construction herein disclosed consists in the fact that the fittings are positively secured in position in the notches or recesses in the panels without recourse to screws passing through the side or escutcheon plates into the body of the panels.

The forms of the invention herein disclosed are merely exemplary. Numerous modifications may be made therein without departure from the spirit of the invention or the scope of the appended claims.

The present application is a continuation in part of applicant's Patent 2,200,387, of May 14, 1940.

What I claim is:

1. In combination a panel of tempered glass, said panel having an approximately rectangular notch formed in an edge thereof to provide a V-like corner, said panel further having a recess formed at the corner, which recess is restricted adjacent to its juncture with the notch, a body disposed in the recess and being confined from displacement in the plane of the panel by the restriction, and cover plates interconnected by a web to provide a rigid shoe secured to the body by screws passing through the web and threaded into the body, the cover plates engaging the adjacent edge portions of the recess to secure the body from displacement in a direction perpendicular to the plane of the door.

2. In combination a panel of tempered glass having a notch with two intersecting sides cut in a corner thereof, the notch having one side intersecting an original edge of the panel and the other side disposed in non-intersecting relation with respect to said edge, the panel further having an arcuate recess formed at the juncture of the two sides of the notch, the juncture between the recess and the notch being restricted, a body disposed in the recess and being so shaped as to be restricted from movement in the plane of the panel, the body further having a portion extending out of the recess and bearing upon an edge of the notch, and side plates secured to the body and engaging the adjacent side portions of the panel whereby to prevent displacement of the body in a direction perpendicular to the plane of the panel.

3. In combination a panel of tempered glass having a notch with two intersecting sides cut in a corner thereof, the notch having one side intersecting an original edge of the panel and the other side disposed in non-intersecting relation with respect to said edge, the panel further having an arcuate recess formed at the juncture of the two sides of the notch, the juncture between the recess and the notch being restricted, a body disposed in the recess and being so shaped as to be restricted from movement in the plane of the panel, the body further having a portion extending out of the recess and bearing upon an edge of the notch, and side plates secured to the body and engaging the adjacent side portions of the panel whereby to prevent displacement of the body in a direction perpendicular to the plane of the panel, said plates being interconnected by an intermediate web to provide a shoe adapted to slip over the edge of the glass, the shoe being joined to the body by screw fastening means extending through the web and being threaded into the body.

4. In combination in a panel of glass, said panel having an approximately rectangular notch formed in an edge thereof to provide a V-like corner, said panel further having a recess formed at the corner, which recess is restricted adjacent to its juncture with the notch, a body disposed in the recess and being confined from displacement in the plane of the panel by the restriction, and cover plates interconnected by a web to provide a rigid shoe secured to the body by screws passing through the web and threaded into the body, the cover plates engaging the adjacent edge portion of the recess to secure the body from displacement in a direction perpendicular to the plane of the door.

GEORGE F. ERATH.